United States Patent [19]

Fadem

[11] Patent Number: 4,962,378
[45] Date of Patent: Oct. 9, 1990

[54] MULTI-USER SERIAL BUS SYSTEM

[75] Inventor: Richard J. Fadem, Roslyn Heights, N.Y.

[73] Assignee: NCR Corporation, Dayton, Ohio

[21] Appl. No.: 118,814

[22] Filed: Nov. 9, 1987

[51] Int. Cl.$^5$ .......................... H04Q 1/30; H04Q 9/02
[52] U.S. Cl. ........................ 340/825.500; 340/825.51; 370/85.6
[58] Field of Search ........... 340/825.51, 825.5, 825.02, 340/825, 825.14; 370/85, 32, 24, 85.1, 85.6; 375/7, 36, 8, 9; 379/93, 96, 98, 194, 442, 161

[56] References Cited

U.S. PATENT DOCUMENTS

| | | | |
|---|---|---|---|
| 4,095,045 | 6/1978 | Johnson et al. | 370/24 |
| 4,486,750 | 12/1984 | Aoki | 340/825.14 X |
| 4,723,120 | 2/1988 | Petty, Jr. | 375/10 |
| 4,730,250 | 3/1988 | Girard et al. | 340/825.5 |
| 4,771,417 | 9/1988 | Maxwell et al. | 375/8 |

FOREIGN PATENT DOCUMENTS 2187609 9/1987 United Kingdom .................. 379/93

OTHER PUBLICATIONS

EIA Standard, RS-422, Electronic Industries Association, Apr. 1975.
EIA Standard, RS-232-C, Electronic Industries Association, Aug. 1969.
G. E. Friend et al., "Understanding Data Communications", Texas Instruments Inc., 1984, pp. 2-18 and 4-13.

Primary Examiner—Ulysses Weldon
Attorney, Agent, or Firm—Wilbert Hawk, Jr.; Stephen F. Jewett; Jack R. Penrod

[57] ABSTRACT

A new, multi-user data communication system is presented which is inexpensive and does not require any hardware changes to the central processor/system host. The standard serial data input/output port of each terminal is adapted from the standard single-user configuration to a party line, multi-user configuration by the addition of a simple and inexpensive interface circuit within each terminal. After the interface circuits are installed, the terminals can be interconnected to each other and to the central processor/system host using standard serial cabling. The party line interface circuit allows each terminal to access the non-busy serial data bus on a first-come-first-served basis. An interference detector and interference handling circuit are provided also to prevent data errors in the event of a possible data collision.

12 Claims, 9 Drawing Sheets

TERMINAL SERIAL DATA PORT

MULTI-USER SERIAL BUS SYSTEM

BACKGROUND

This invention relates to the field of digital data communications and more particularly to multi-user digital data communication systems An important performance parameter of digital computing systems for business applications is the cost per user. Since many typical business applications, such as word processing and record keeping, do not require significant amounts of processing time; the use of a system with a single digital processor connected to multiple users to provide the individual processing needs of each user can be more cost effective than other arrangements. A typical multi-user system for business application has a central processing unit, which acts as the system host, and a number of video display terminals, VDT's, as the multiple data entry points. The terminals are connected to the host by means of a digital data communication system.

In order for a multi-user system to be cost competitive with multiple single-user systems, the digital data communication system interconnecting the host computer with the user terminals must be inexpensive. Moreover, in order to keep operating expenses down, the digital data communication system must be capable of handling the data communication requirements of all of the multiple users without significantly burdening the terminal operators with time consuming communication procedures. Furthermore, to allow for the greatest number of users, the amount of host computation time required to operate the data communication system should be minimized.

The data communication system disclosed in U.S. Pat. No. 3,898,373, issued Aug. 5, 1975 to L. Walsh, has a serial bus system in which a two conductor cable connects the host computer in parallel to all the remote units, including VDT's. The two conductor cable between the units is one of the least expensive devices for interconnection, thus this portion of the design minimizes the cost per user of a multi-user system. However, the polling procedure used for accessing the two conductor, serial data bus and the complex digital circuit apparatus required to interface the various units to the two conductor serial data bus are both far from minimal with regard to central processor time consumed by the polling procedures, and with regard to the electronic hardware needed to form the interface circuits. Furthermore, in such a design as this, central processor time is needlessly occupied by polling units which do not have data to be communicated.

The digital data communication system disclosed in U.S. Pat. No. 4,063,220, issued Dec. 13, 1977 to R. Metcalfe et al., similarly has a serial data bus using a two conductor cable, but instead of central processor controlled polling, the bus connected units control themselves. This is achieved by having each interface unit monitor the data bus for a specific time period and if the bus is unused for a preset time period, a unit with data to communicate may then transmit via a data burst or a packet directed to a receiving unit. Those skilled in the art will recognize that this procedure leaves open the possibility of two or more units transmitting concurrently on the bus leading to a data communication interference. The interference problem is solved by R. Metcalfe et al. by having each interface monitor the bus while it is transmitting. Whenever the data received during transmission does not match the data transmitted, data transmission ceases and each previously transmitting interface circuit waits a randomly selected time period before beginning a subsequent monitor/transmit cycle.

It is evident that an interface circuit which includes a first storage register that stores the data transmitted from the unit, a second storage register that stores the data appearing on the data bus during transmission, comparative circuitry to determine if the data stored in these two registers are equivalent, and a random retransmit time selector; has a high degree of complexity and a likewise high per unit expense. Thus, although this system does not needlessly occupy central processor time, as does the U.S. Pat. No. 3,898,373 discussed above, the alternative expense of providing the control procedure and control circuitry for the burst mode of data communication within each user interface is high.

Another digital data communication system disclosed in U.S. Pat. No. 4,281,380, issued Jul. 28, 1981 to N. DeMesa III et al., has a serial data bus which is operated in the burst or packet communication mode as the system shown in U.S. Pat. No. 4,063,220 discussed above. There are some differences in implementation however. This data communication system monitors a common 'busy' bus line to determine if the bus is available, instead of monitoring the serial data communication lines, as is the practice of the previously discussed patent. Secondly, instead of monitoring the transmitted data communication for an interference condition, this system monitors the serial data bus for an acknowledge character from the receiving unit. Failure to receive an acknowledge character from the receiving unit is presumed to evince the occurrence of an interference condition. After a presumed interference condition, each unit, transmitting at that time, waits a respective period of time before re-attempting to access the 'busy' line and subsequently transmit. Each respective waiting period is predetermined by the priority of the unit and is preselected to be sufficiently different from the others to prevent a second data interference condition between the two original units involved.

This system, although it is a better non-polling system than the system of U.S. Pat. No. 4,063,220 in some aspects, in others it is not. The assumption of an interference condition from non-receipt of an acknowledge character simplifies and reduces the storage register design requirements of the interface, but at the cost of a complex protocol, including a timer for timing the acknowledge message and the programmed wait period upon occurrence of an interference. These complex circuits and procedures will cause the cost of each interface circuit to be high.

Other patents providing background information concerning digital data communication systems are U.S. Pat. Nos. 4,593,283; 4,521,880; 4,494,113; 4,405,981; 4,387,425; 4,385,382; 4,365,294; 4,210,780; and 4,128,883. The article Ethernet: Distributed Packet Switching for Local Computer Networks by R. Metcalfe and D. Boggs, published in the Jul. 1976 issued of "Communications of the ACM", also provides background information on the subject of digital data communications.

It is an object of the present invention to provide a digital data communication system which uses standard single user digital data bus cabling and connectors, and by means of a simple interface circuit transforms the single user system into a multi-user digital data communications bus.

It is another object of the present invention to provide a digital data communication system which has a simple and effective procedure to access the data bus and to recover from data interferences.

It is a further object of the present invention to provide a non-prioritized, digital data communication system in which each user has exclusive use of the the digital data communication system between the respective user terminal and the host computer on a first-come-first-served basis until all data of the current digital data communication from the respective user terminal is complete.

SUMMARY OF THE INVENTION

Briefly stated, in accordance with one aspect of the invention the aforementioned objects are achieved by providing a digital data communication system for transferring data between a number of terminals and a central processor having first and second serial data conductors connected between the central processor and the number of terminals for outputting data to the central processor. A third serial data conductor is connected between the central processor the terminals for receiving data from the central processor. A clear-to-send control conductor is connected from the central processor to the terminals for enabling a data transfer between the central processor and one of the terminals. A request-to-send device is connected for outputting a request-to-send indicator to the central processor enabling the data transfer from the central processor to at least one of the terminals. Another device is connected to the first, second and third serial data conductors for detecting a not-busy condition thereof. Moreover, a further device, which is responsive to the not-busy detecting device, controls the outputting of data to the central processor from one of the terminals via the first and second serial data conductors on a first-come, first-served basis.

Each terminal has a simple, party line interface circuit, connected between the above mentioned three conductors and the standard serial data port of the terminal for enabling each terminal to transfer data only when each of the other terminals and the central processor are not transferring data.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings wherein like numbers designate like components in the several views and in which:

DESCRIPTION OF THE PREFERRED EMBODIMENT

Figure 1:
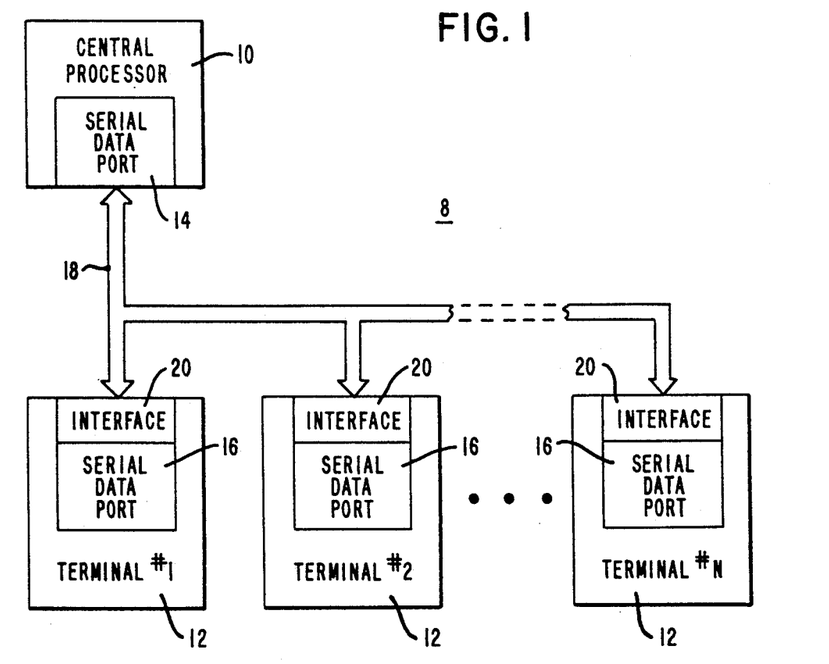
FIG. 1 is a block diagram of the communication system.

Referring to FIG. 1, a central processor 10 operates as the host processor of a multi-user data communication system 8. The central processor 10 is connected to a number of user terminals 12 by a serial data bus 18. The serial data bus 18 is connected at one node to a processor serial data port 14 of the central processor 10. This processor port 14 is in accordance with one of the industry standards for a full duplex, serial data bus. The serial data bus 18 is additionally connected in parallel at each of the remaining nodes to a respective user terminal 12.

Each user terminal 12, such as a VDT, has a standard, full duplex, terminal serial data port 16, which is the corresponding port of the processor port 14. The ports 14, 16 are each designed to terminate a respective end of the system as a standard, single-user unit. For this reason, each terminal serial data port 16 is provided with a party line interface circuit 20 to coordinate and adapt this single-user, serial data bus system into a multi-user, serial data bus system.

Figure 2A:
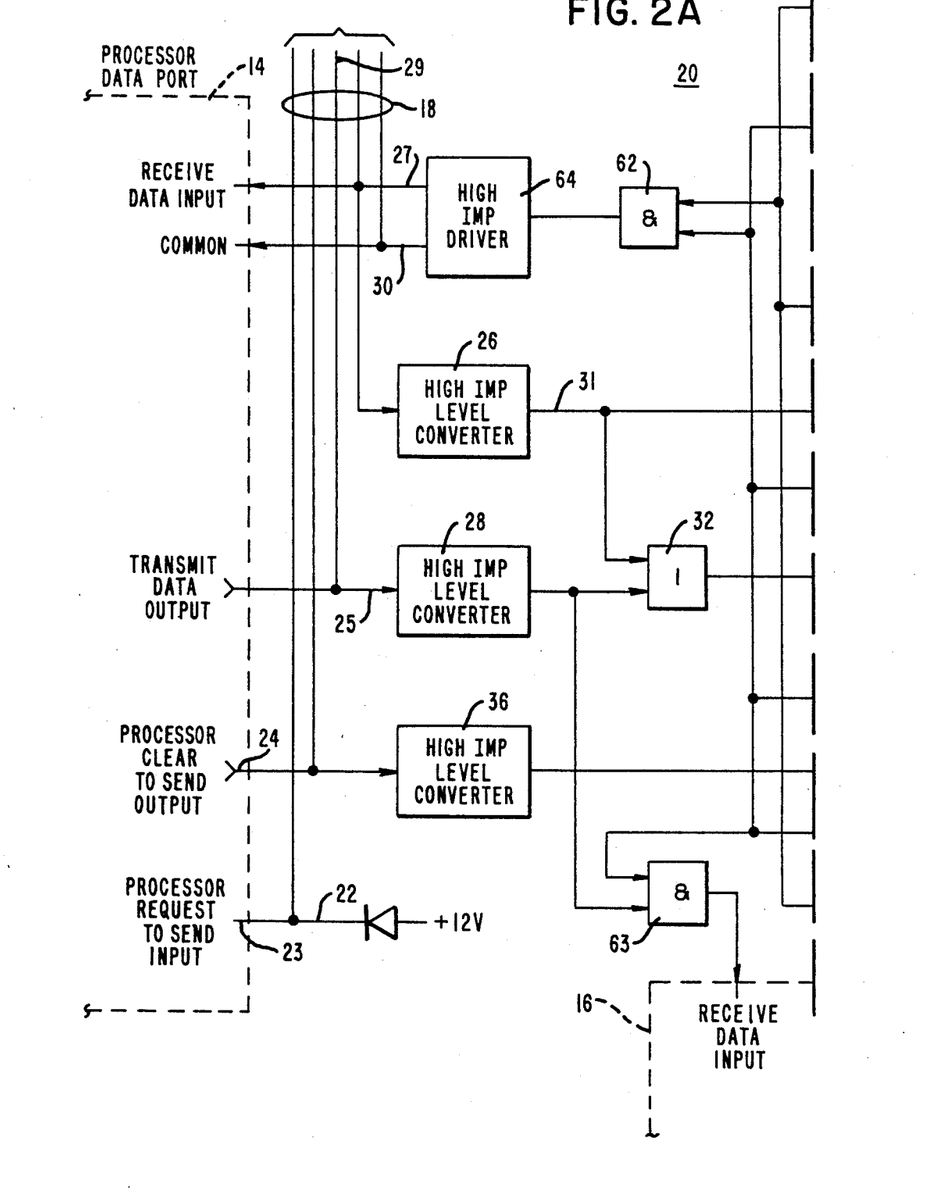
FIGS. 2A and 2B when assembled together form a logic function diagram of one of the interface circuits.
Figure 2B:
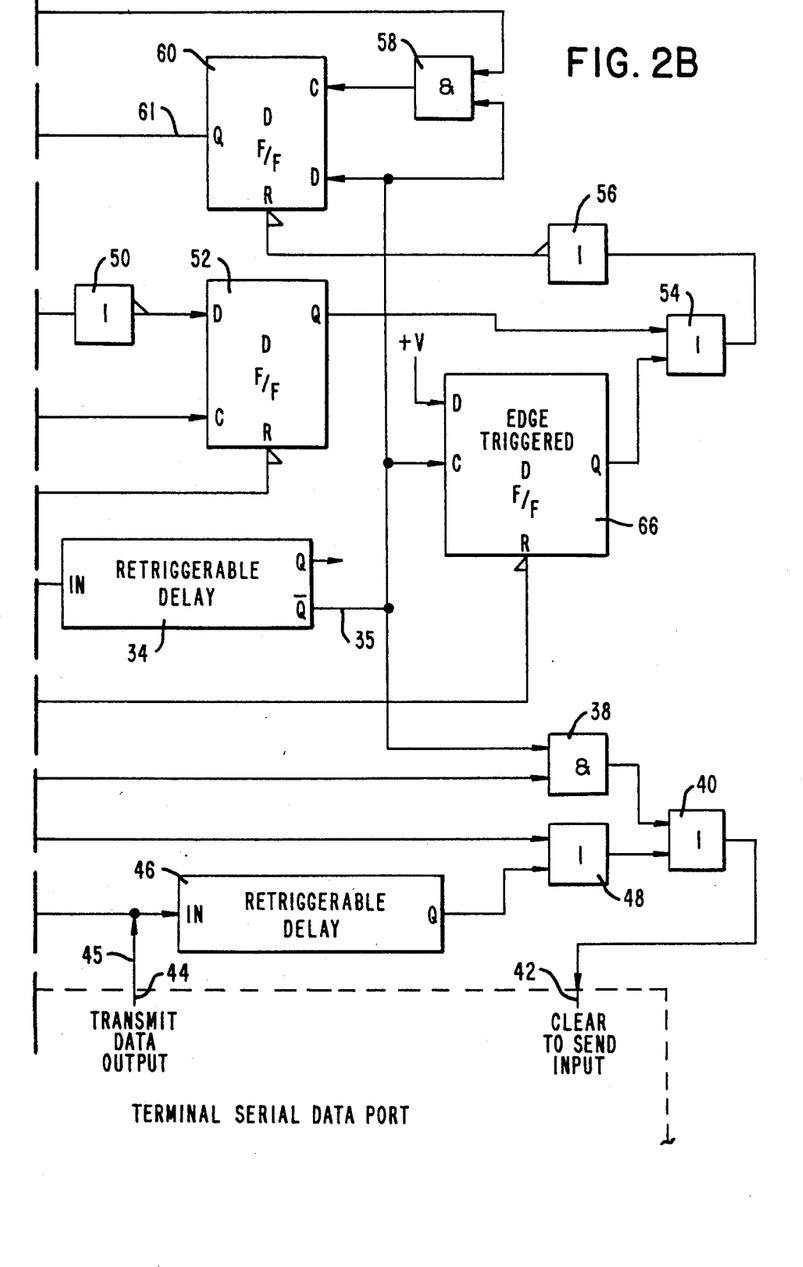
Figures 3, 3E:
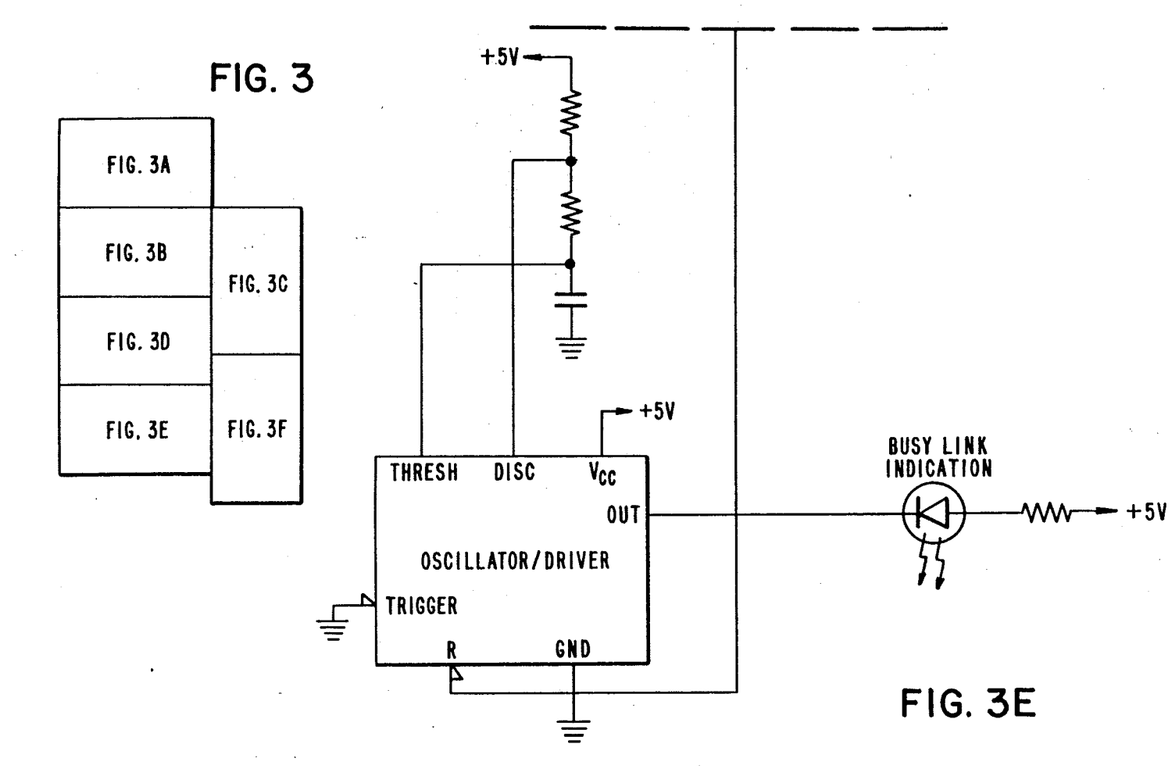
FIGS. 3A through 3F when assembled according to the map of FIG. 3, show an electronic circuit diagram of an interface circuit of one of the system terminals of one embodiment of the invention.
Figure 3A:
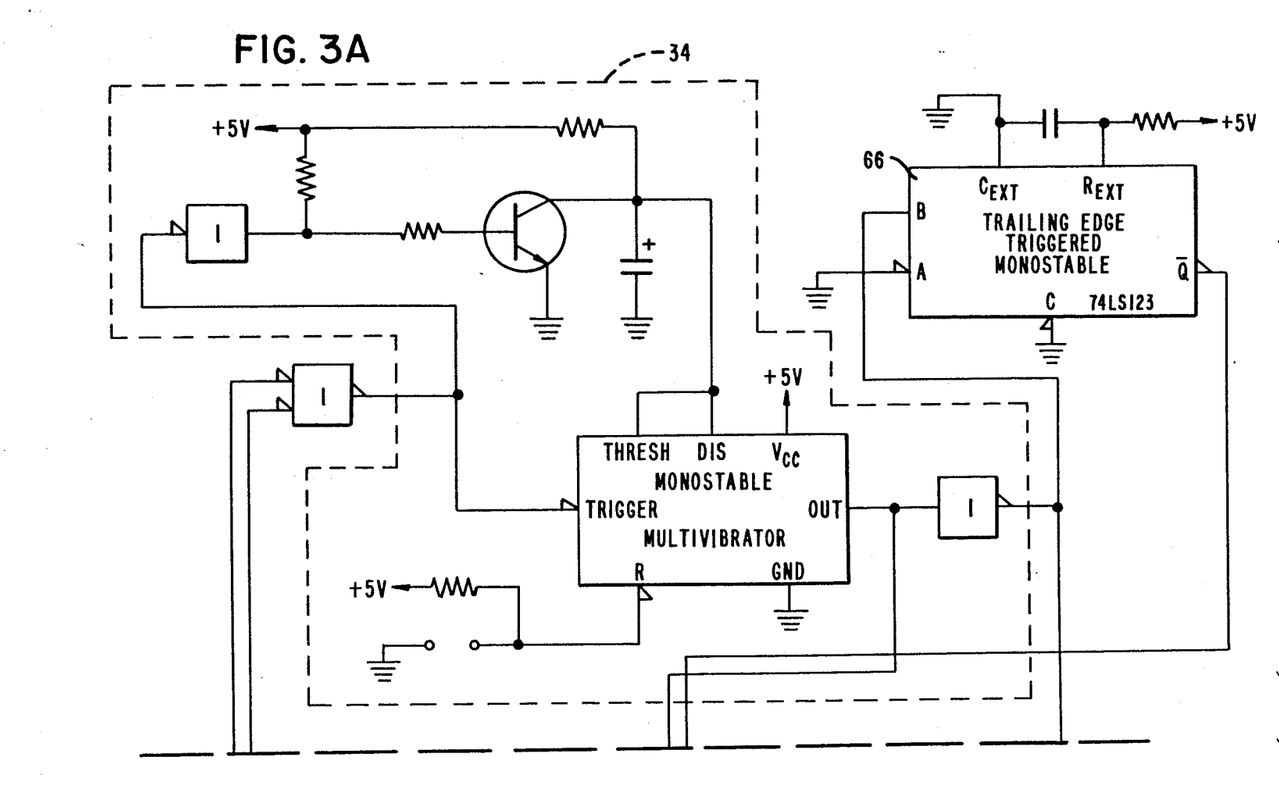
Figure 3B:
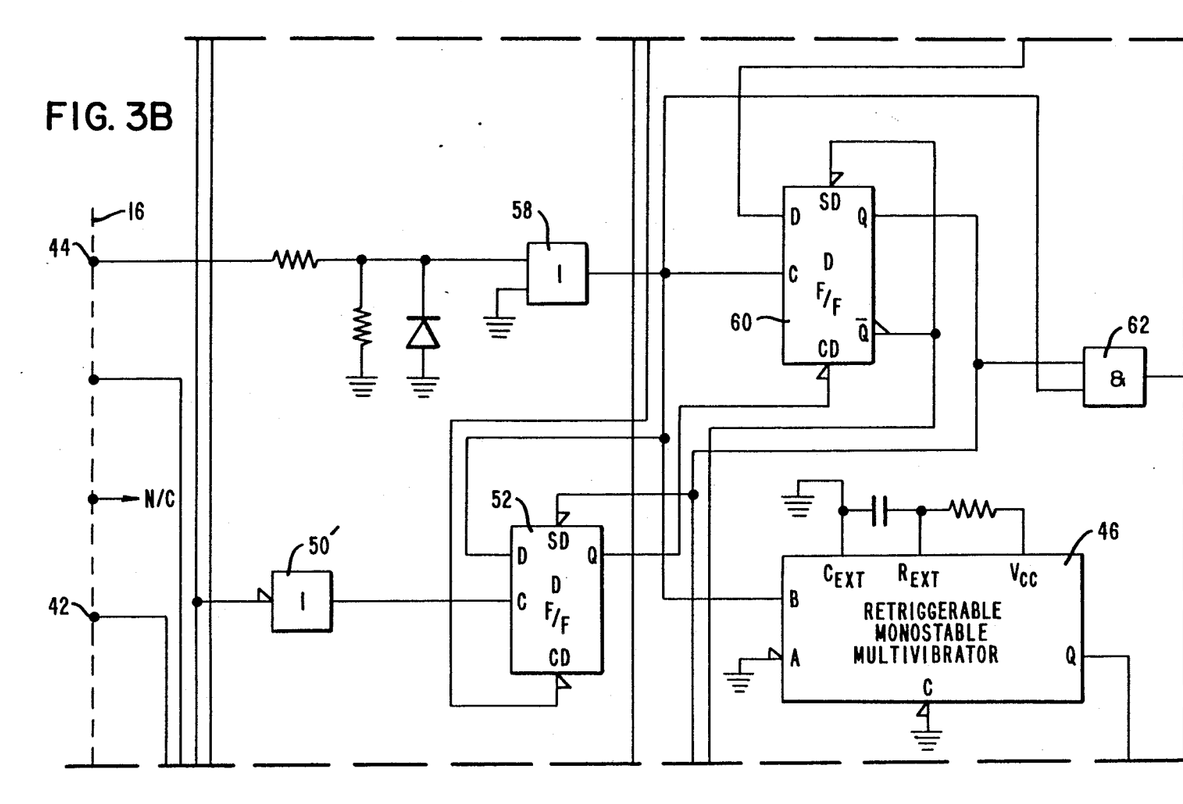
Figure 3C:
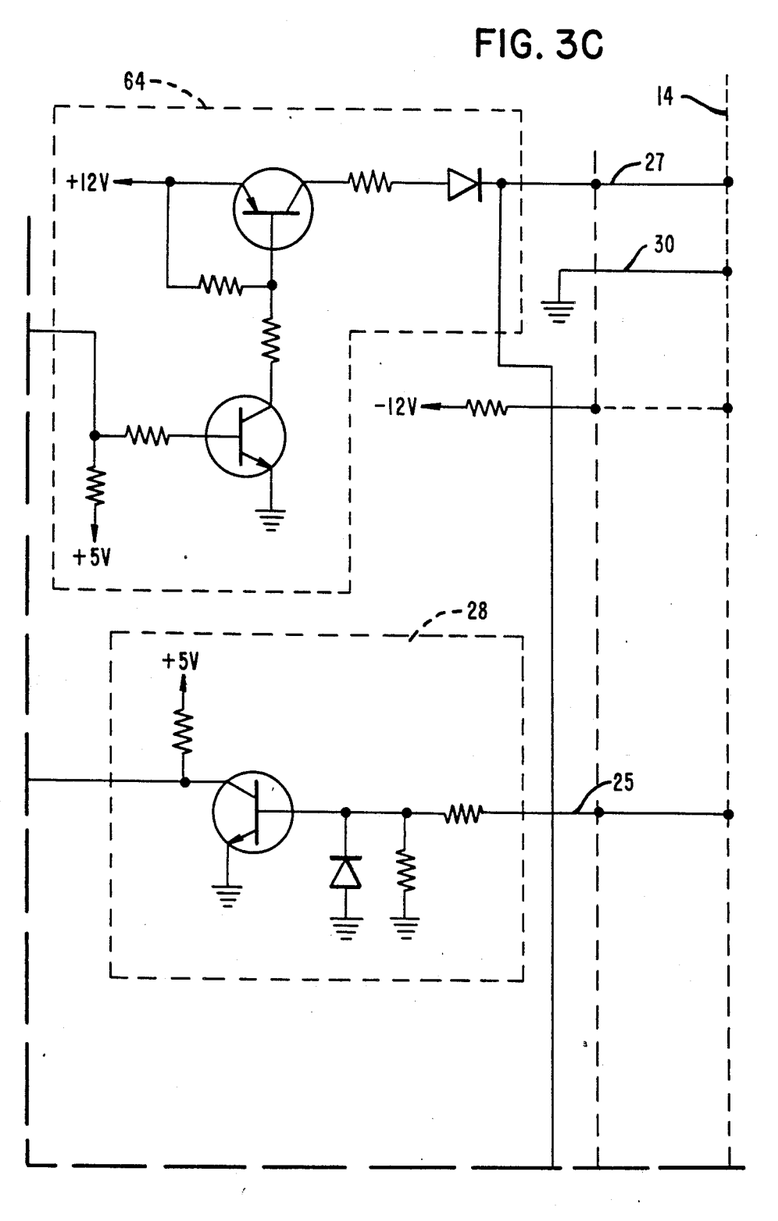
Figure 3D:
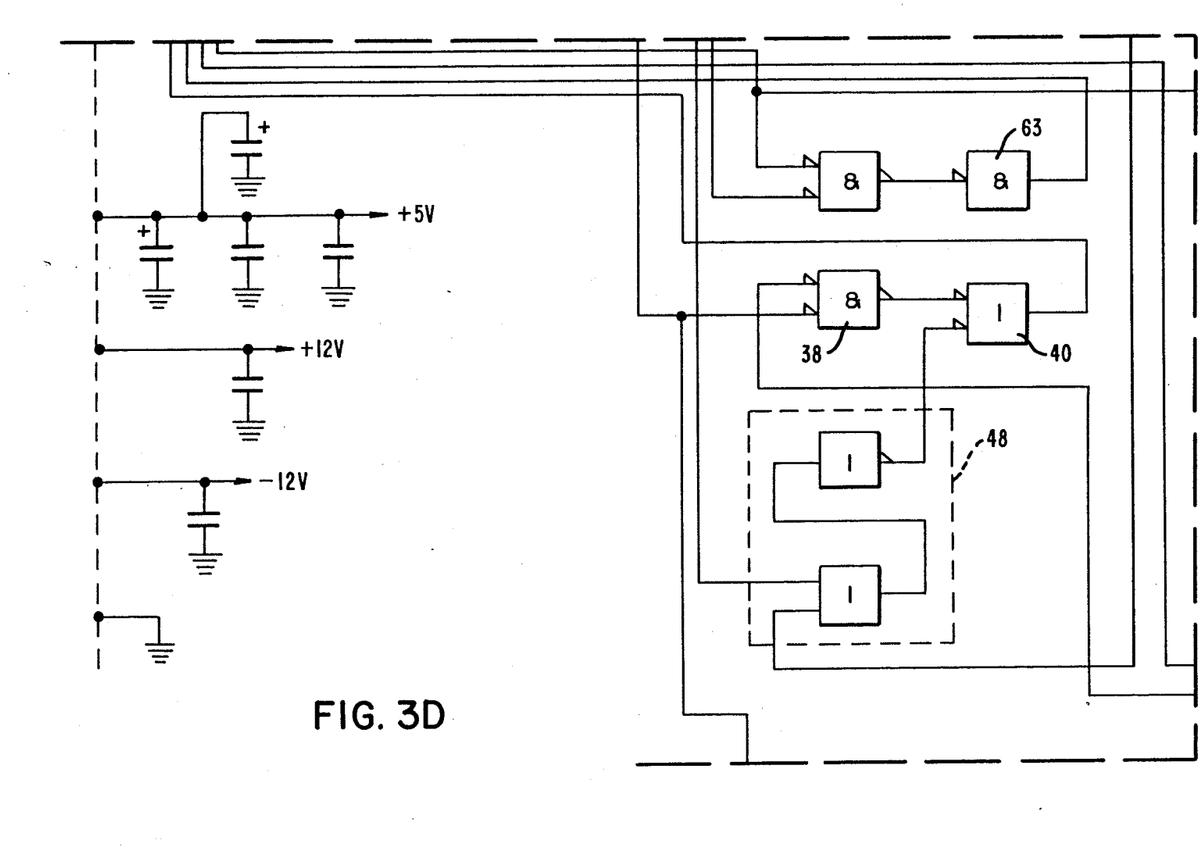
Figure 3F:
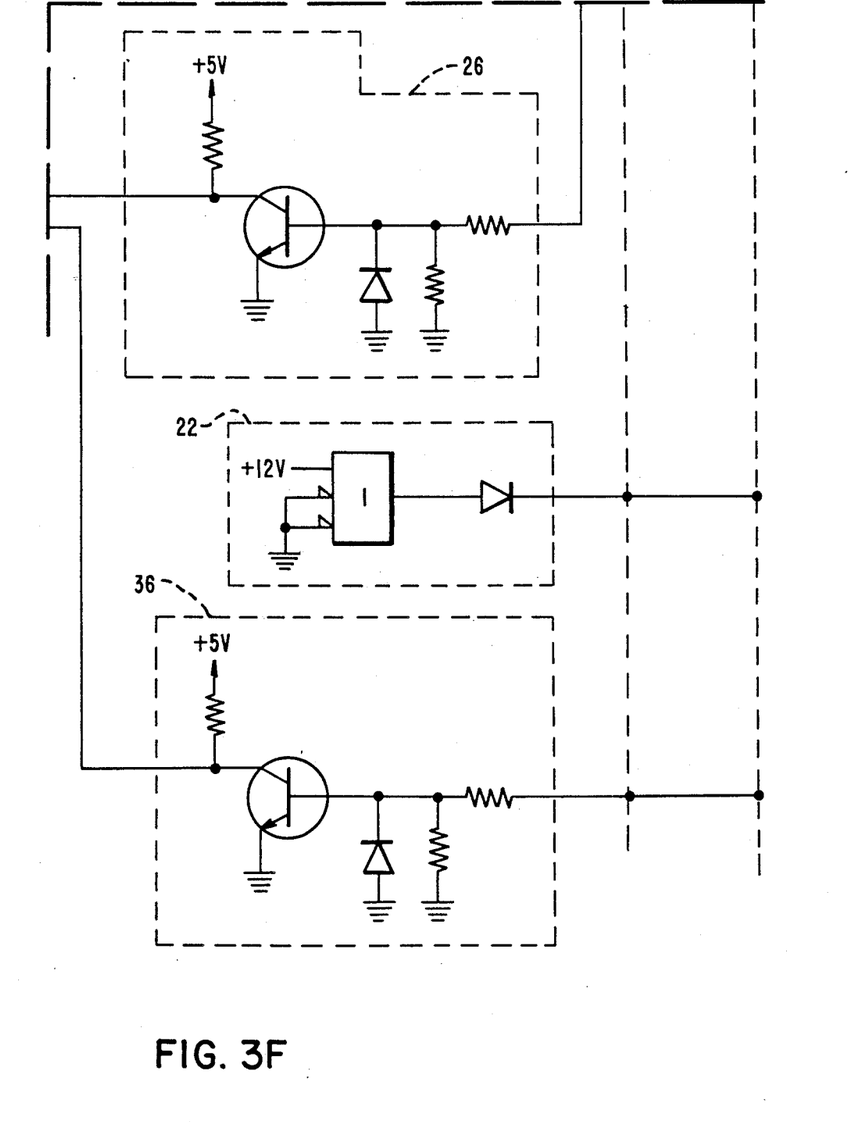

Turning now to FIGS. 2A and 2B, the multi-user, serial data protocol and the operation of each party line interface circuit 20 will be explained. In the preferred embodiment of the invention, the standard, full duplex, serial data ports 14, 16 conform to the Electronic Industries Association RS 232C standard. Those skilled in the art will appreciate that with minor modifications other embodiments of the invention conforming to other serial data bus standards are possible; for example RS b 422, and such modifications are deemed to be part of the present invention. The RS 232C protocol includes an exchange of signals, commonly known as a 'handshake', which occurs before any data is exchanged between the processor port 14 and the user terminal 12. The processor port 14 looks for an ON state outputted by the terminal's Request to Send circuit 22 is a condition for the reception of data from one of the user terminals 12. When an ON state is present on the processor port Request to Send circuit 23, an ON state present on the Clear to Send circuit 24 indicates that the central processor 10 is ready to receive and process data transmitted from one of the user terminals 12. This Clear to Send is typically ON in a full duplex protocol whenever the processor power is ON and a terminal 12 is connected at processor port 14. The exception would be if the central processor 10 were also programmed to perform a higher priority task, in which case the Clear to Send state would be OFF until the higher priority task is completed and once again the central processor 10 is able to service the serial data bus 18. This normally ON, full duplex Clear to Send state ensures maximum availability of the serial data bus 18 to the user terminals 12.

The RS 232C Clear to Send and the Request to Send signals control the transmission of data across an open channel. These two control signals, in the applicant's invention, are supplemented by the party line interfaces 20, which allows the plurality of the user terminals 12 to operate in cooperation with each other.

Each of the party line interfaces 20 is connected to the serial bus 18 and to a respective user terminal port 16. The serial data bus connects each interface 20 in parallel to the processor port 14 and to the interfaces 20 of the other user terminals 12. This bus communication system performs full duplex data transfers between any one of the terminals 12 and the processor 10. Terminalto-terminal or processor-to-multiple-terminal serial data transfers are not part of the present invention.

Each of the interfaces 20 has a high impedance level converter 26 connected to the terminal-to-processor bus line 27, and another high impedance level converter 28 connected to the processor-to-terminal bus line 29. These converters 26,28 convert the higher impedance, higher voltage signals of the bus 18 to TTL impedance and voltage levels for logical switching operations. One output from each level converter 26,28 is connected to a respective input of a logical OR gate 32. The output of the logical OR gate 32 is a logic 1 whenever any terminal 12. transmits data on bus line 27, or the processor transmits data on bus line 29. This output, therefore, is an indicator that a data transfer is in progress between one of the party line interfaces 20 and the central processor 10. The output of the logical OR gate 32 is connected to an input of a RETRIGGERABLE DELAY 34, which in response to any logic 1 input delays the cessation of the logic 1 level at its output for a predetermined period of time. The predetermined period of time, which in the shown embodiment is a nominal 4 seconds, is an indication that either one or both of the bus lines 27,29 is or has been busy with a data transfer within the previous 4 seconds. The complemented output $\overline{Q}$ of the RETRIGGERABLE DELAY 34 is connected by a conductor 35 to one of two inputs of a logical AND gate 38. The other input of logical AND gate 38 is connected to the processor Clear to Send bus line 24 through a high impedance level converter 36. The output of logical AND gate 38 is connected to one input of logical OR gate 40 (the other input will be discussed later). The output of logical gate 40 is connected to the user terminal port 16 of the terminal Clear to Send input 42.

Operation of this portion of the interface 20 is as follows: the processor Clear to Send signal, which is virtually always ON, is conducted over a bus line 24 and through converter 36, where it is logically AND'ed with the complement of the busy indication $\overline{Q}$. If the bus lines 27,29 are not busy, the output of the logical AND gate 38 will propagate through the logical OR gate 40 to the user terminal Clear to Send input 42 which is thereby set to ON. On the other hand, if the bus lines 27,29 are busy, the complement of the busy indication $\overline{Q}$ will be a logical 0 which as an input to logical AND gate 38 will result in an OFF signal propagating through the logical OR gate 40 to the user terminal port 16 Clear to Send input 42. Under RS-232C protocol, an ON signal on the Clear to Send input allows the user terminal 12 to output data from the Transmit Data output 44 and, if all conditions are favorable, as will be explained later, over the. non-busy bus line 27 to the processor port 14. An OFF signal on the Clear to Send input 42, on the other hand, prevents data from being outputted from the Transmit Data output 44. Furthermore, the changing of an ON to an OFF signal will prevent the continuation of a data transmission from Transmit Data output 44 if one is in process at the time of the change.

The RETRIGGERABLE DELAY 34 plays an important role in the control of the Clear to Send terminal 42. The RETRIGGERABLE DELAY 34 is retriggered every time data is transmitted over either bus line 27 or 29. Each retriggering sets the $\overline{Q}$ output to logic 0 for the delay period. The RETRIGGERABLE DELAY 34 in each respective interface 20 disables the logical AND gate 38 causing the respective Clear to Send 42 to go to OFF in each terminal 12 except for the active one which caused the retriggering by transferring data across the bus line 27. In the interface 20 which is active in a current transaction, the Clear to Send signal is supplied by other circuitry and the RETRIGGERABLE DELAY 34 further provides a different function, as will be explained below.

The Transmit Data output 44 is connected to an input of a RETRIGGERABLE DELAY 46 which delays the cessation of any logic 1 input for 20 milliseconds nominally. The output of the RETRIGGERABLE DELAY 46 is connected to an input of the logical OR gate 48. The output of the logical OR gate 48 is connected to a second input of the logical OR gate 40. As a data stream is transmitted from the Transmit Data output 44, the stream of logic 1's and 0's is converted into a constant logic 1 at the output of the RETRIGERABLE DELAY 46. The constant logic 1 out of the RETRIGGERABLE DELAY 46 propagates through the logical OR gate 40, assuming for the moment that the other input is a logic 0, and latches the Clear-to-Send terminal 42 at logic 1 until all data included in the transmission has been communicated and has, subsequently, been inactive for over 20 milliseconds. This feature ensures that all of the data in a block data transfer is cleared out of the terminal 12, even if a bus interference occurs or the processor Clear to Send 24 goes to the OFF state. This is important since a stored partial block of data would cause errors in the next transmission from an interference interrupted terminal unless the data of the partial block is cleared out.

The Transmit Data output 44 is also connected to two other inputs: a first input to a logical AND gate 58; and a first input to a logical AND gate 62. The logical AND 58 has a second input which is the output of the RETRIGGERABLE DELAY 34. The output of the logical AND gate 58 is connected to the Clock input of a D type flip-flop 60. The D input of the D type flip-flop 60 is also connected to the $\overline{Q}$ output of the RETRIGERABLE DELAY 34. As stated previously, the output $\overline{Q}$ of the RETRIGGERABLE DELAY 34 is a logic 1 if bus lines 27,29 have not been busy transferring data within the previous four seconds, and a logic 0 if bus lines 27,29 have been busy transferring data in the previous four seconds. A logic 1 on the $\overline{Q}$ output of RETRIGGERABLE DELAY 34 puts a logic 1 on the D input of flip-flop 60, and enables data transmission through the logical AND gate 58. This leaves the Transmit Data bus line open to be seized on a first-come, first served basis by the terminal 12 to initiate a data transmission. Data outputted on the Transmit Data terminal 44 goes into the enabled logical AND gate 58 and the first logic 1 data level will 'clock' flip-flop 60 to a set state providing a logic 1 on its Q output. Once set, the flip-flop 60 is in an ON-LINE state where further combinations of logic levels at the D input and at the logical AND gate 58 inputs will not have any further influence on the state of the flip-flop 60. The ON-LINE state is supplied to further inputs by interconnect line 61. The line 61 connects the ON LINE state to one input of the logical AND gate 62 enabling the transmission of the data to a high impedance driver 64. From the high impedance driver 64 the data is then driven across the bus line 27 to the Receive Data input of the processor port 14.

The interconnect line 61 also connects the output of the ON LINE flip-flop 60 to a logical AND gate 63.

The other input of the logical AND gate 63 is connected to a Transmit Data output of the port 14 by the bus line 25 and the high impedance converter 28. The ON LINE state enables a Receive Data input of the port 16 of the active terminal to receive the Transmit Data output signals from the port 14 in full duplex operation through the logical AND gate 63 during the period of the RETRIGGERABLE DELAY 34, which will be explained further below. In the preferred embodiment of the invention, this feature allows a clear screen command to be transmitted from the processor 10 to the terminal 12 that has just sent an error free block of data such as a business record. If the clear screen command is not received by the expiration of the period of RETRIGGERABLE DELAY 34, this is an indication to the operator that the data was not accepted by the processor 10, and the operator should re-transmit that business record at the next available not-busy, bus period. Depending on the program executed by the host processor 10, this feature could also be used to transmit alpha-numeric messages, instead of a clear screen command, from the processor 10 to the active terminal 12.

Lastly, the Transmit Data output 44 is connected to an inverter 50. The output of inverter 50 is connected to the D input of a D type flip-flop 52. The Clock input of the D flip-flop 52 is connected to the output of the high impedance converter 26. The D flip-flop 52 is the data interference detector. If there is no interference, the data into the D input and the Clock input of flip-flop 52 will be complements, with the Clock input being slightly delayed by the combination of the logic AND gate 62, the driver 64, and the converter 26. Under such circumstances, the resulting Q output of the flip-flop 52 will be a logic 0. If another terminal 12 has initiated data transfer at substantially the same instant of time, the data inputted to the Clock input of the flip-flop 52 will not be the exact complement of the data transferred from the Transmit Data terminal 44. This will cause one of the flip-flops 52 in one of the active interfaces 20 to set its Q output to a logic 1, and, by propagating that logic 1 through its respective logical OR gate 54 and its respective inverter 56, will cause the respective ON LINE flip-flop 60 to reset. Resetting of the ON-LINE flip-flop 60 disables the logical AND gate 62 and thereby disables further interference by data transferred from the interface 20 which detected the interference. In such a case as this, the RETRIGGERABLE DELAY 46 holds the local terminal Clear to Send 42 ON until the block transfer has been cleared from the terminal 12, which was interrupted by a detection of an interference, so a partial block transfer stored in memory does not subsequently cause data errors as previously explained.

Each RETRIGGERABLE DELAY 34 continuously retriggers as long as data is sent between the transferring terminal 12 and the responding central processor 10. After each data transaction, is over, and after the preset delay period has expired, each RETRIGGERABLE DELAY 34 resets its respective $\bar{Q}$ output to logic 0. The $\bar{Q}$ output is connected to the Clock input of Trailing Edge Triggered D flip-flop 66. The D input is connected to +V which is equivalent to logic 1. When the Clock input makes a logic 0 to logic 1 transition, the Q output of the flip-flop 66, which has previously been reset by the connection between the Q output of ON LINE flip-flop 60 and the Reset input of flip-flop 66, is set to logic 1. The Q output of flip-flop 66 is connected through the logical OR gate 54 and the logical inverter 56 to the Reset input of ON LINE flip-flop 60. When the logic 1 from the Q output of the flip-flop 66, which indicates the end of the data transfer period, is presented by the inverter 56 as an active low to the reset input of the ON LINE flip-flop 60; the ON LINE flip-flop 60 is reset with its Q output switching to a logic 0. This switches the ON LINE state to logic 0, and completes the data transfer sequence by also switching the Q output of the flip-flop 66 to logic 0.

Referring now to FIGS. 3A through 3F, there is shown a schematic diagram of the invention depicted in FIGS. 2A and 2B with only minor changes, such as using the complement of some logical outputs and inputs instead of the uncomplemented signals as shown in FIGS. 2A and 2B. The portions of FIGS. 3A through 3F which are surrounded by dashed lines correspond to the portions of FIG. 1 and FIG. 2A and 2B which have like numbers. Those skilled in the art will be readily able to understand the schematic diagram of FIGS. 3A through 3F from the block diagram of FIGS. 2A and 2B, and the description set forth in the specification and claims.

It will now be understood that there has been disclosed a simple and inexpensive apparatus for adapting a standard single user bus system into a multi-user, party line, serial bus system. As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

I claim:

1. A digital data communication system for transferring data between a plurality of terminals to a central processor, comprising:

a first serial data conductor connected between the central processor and the plurality of terminals for outputting data to the central processor;

a second serial data conductor connected between the central processor and the plurality of terminals for receiving data from the central processor;

a clear-to-send control conductor connected from the central processor to the plurality of terminals for enabling a data transfer between the central processor and one of the plurality of terminals;

request-to-send means for outputting a request-to-send indicator to the central processor enabling the data transfer from the central processor to one of the plurality of terminals;

means for detecting a not-busy condition of the first and second serial data conductors;

means responsive to the not-busy detecting means for controlling the outputting of data to the central processor from one of the plurality of terminals via the first serial data conductor on a first-come, first-served basis; and delay means for preventing each terminal from initiating a data transfer for a preselected delay period after the cessation of the busy condition to provide the terminal and the central processor a period to respond to the data transfer therebetween.

2. The digital data communication system according to claim 1, further comprising interference detecting means connected to the first serial data conductor for detecting an interference condition of at least two terminals outputting data onto the first serial data conductor concurrently.

3. The digital data communication system according to claim 2, further comprising:
   means responsive to the interference detecting means for interrupting the transfer of data from one of the terminals concurrently outputting data onto the first serial data conductor; and
   means responsive to the interrupting means for clearing from the terminal interrupted during an interfering transfer of data the portion of the interrupted data remaining within the terminal.

4. A digital data communication system according to claim 1, wherein the first and second serial data conductors and the clear-to-send control conductor are parts of a standard RS 232 cable.

5. A digital data communication system according to claim 4, wherein the central processor has a RS 232 standard serial data port connected to all of the plurality of terminals via the standard RS 232 cable.

6. A digital data communication system for transferring data between a plurality of terminals to a central processor, comprising:
   a first serial data conductor connected between the central processor and the plurality of terminals for outputting data to the central processor;
   a second serial data conductor connected between the central processor and the plurality of terminals for receiving data from the central processor;
   a clear-to-send control conductor connected from the central processor to the plurality of terminals for enabling a data transfer between the central processor and one of the plurality of terminals;
   request-to-send means for outputting a request-to-send indicator to the central processor enabling the data transfer from the central processor to one of the plurality of terminals;
   means for detecting a not-busy condition of the first and second serial data conductors;
   means responsive to the not-busy detecting means for controlling the outputting of data to the central processor from one of the plurality of terminals via the first serial data conductor on a first-come, first-served basis;
   a plurality of means for detecting a busy condition of the first and second serial data conductors, each located in a respective terminal, for controlling the outputting of data to the central processor by preventing each terminal not involved in a data transfer from initiating a data transfer as long as one of the first and second serial data conductors is in a busy condition;
   interference detecting means connected to the first serial data conductor for detecting an interference condition of at least two terminals outputting data onto the first serial data conductor concurrently;
   means responsive to the interference detecting means for interrupting the transfer of data from one of the terminals concurrently outputting data onto the first serial data conductor; and
   means responsive to the interrupting means for clearing from the terminal interrupted during an interferring transfer of data the portion of the interrupted data remaining in the terminal.

7. A digital data communication system according to claim 17, wherein the first and second serial data conductors and the clear-to-send control conductor are parts of a standard RS 232 cable.

8. A digital data communication system according to claim 7, wherein the central processor has a RS 232 standrd serial data port connected to all of the plurality of terminals via the standard RS 232 cable.

9. A digital data communication system for transferring data between a plurality of terminals to a central processor, comprising:
   a first serial data conductor connected between the central processor and the plurality of terminals for transferring data to the central processor, said first serial data conductor exclusively transferring serail data to said central processor;
   a second serial data conductor connected between the central processor and the plurality of terminals for tranferring data from the central processor, said second serial data conductor exclusively tranferring serial data from said central processor;
   a clear-to-send control conductor connected from the central processor to the plurality of terminals for enabling a data transfer between the central processor and one of the plurality of terminals;
   request-to-send means for outputting a request-to-send indicator to the central processor enabling the data transfer from the central processor to one of the plurality of terminals;
   means for detecting a not-busy condition of the first and second serial data conductors;
   means responsvie to the not-busy detecting means for controlling the outputting of data to the central processor from one of the plurality of terminals via the first serial data conductor on a first-come, first-served basis; and
   delay means for preventing each terminal from initiating a data transfer for a preselected delay period after the cessation of the busy condition to provide the terminal and the central processor a period to respond to the data transfer therebetween.

10. The digital data communication system according to claim 9, further comprising interference detecting means connected to the first serial data conductor for detecting an interference condition of at least two terminals initiating data transfers to the central processor via the first serial data conductor concurrently.

11. The digital data comprising system according to claim 10, further comprising:
   means responsive to the interference detecting means for interrupting the transfer of data from one of the terminals concurrently outputting data onto the first serial data conductor; and
   means responsive to the interrupting means for clearing from the terminal interrupted during an interfering transfer of data the portion of the interrupted data remaining within the terminal.

12. A digital data communication system for transferring data between a plurality of terminals to a central processor, comprising:
   a first serial data conductor connected between the central processor and the plurality of terminals for transferring data to the central processor, said first serial data conductor exclusively transferring serial data to said central processor;
   a second serial data conductor connected between the central processor and the plurality of terminals for tranferring data from the central processor, said second serial data conductor exclusively transferring serial data from said central processor;

a clear-to-send control conductor connected from the central processor to the plurality of terminals for enabling a data transfer between the central processor and one of the plurality of terminals;

request-to-send means for outputting a request-to-send indicator to the central processor enabling the data transfer from the central processor to one of the plurality of terminals;

means for detecting a not-busy condition of the first and second serial data conductors;

means responsive to the not-busy detecting means for controlling the outputting of data to the central processor from one of the plurality of terminals via the first serial data conductor on a first-come, first-served basis;

a plurality of means for detecting a busy condition of the first and second serial data conductors, each located in a respective terminal, for controlling the tansferring of data to the central processor by preventing each terminal not involved in a data transfer from initiating a a data transfer as long as one of the first and second serial data conductors is in a busy condition; interference detecting means connected to the first serial data conductor for detecting an interference condition of at least two terminals initiating data transfers to the central processor via the first serial data conductor concurrently;

means responsive to the interference detecting means for interrupting the transfer of data from one of the terminals concurrently initiating data transfers to the central processor via the first serial data conductor; and means responsive to the interrupting means for clearing from the terminal interrupted during an interfering transfer of data the portion of the interrupted data remaining in the terminal.

* * * * *

UNITED STATES PATENT AND TRADEMARK OFFICE
CERTIFICATE OF CORRECTION

PATENT NO. : 4,962,378

DATED : October 9, 1990

INVENTOR(S) : Richard J. Fadem

It is certified that error appears in the above-identified patent and that said Letters Patent is hereby corrected as shown below:

Column 9, line 68, "17" should be --6--.

Column 10, line 5, "standrd" should be --standard--.

Column 10, line 13, "serail" should be --serial--.

Column 10, line 30, "responsvie" should be --responsive--.

Column 10, line 46, "comprising" should be --communication--.

Column 12, line 2, "a" should be deleted.

Signed and Sealed this

Seventeenth Day of March, 1992

Attest:

HARRY F. MANBECK, JR.

Attesting Officer     Commissioner of Patents and Trademarks